US012563144B2

(12) United States Patent
Mishra et al.

(10) Patent No.: US 12,563,144 B2
(45) Date of Patent: Feb. 24, 2026

(54) SYSTEMS AND METHODS FOR GENERATING DYNAMIC LINKS IN FEDERATED DATA CHANNELS

(71) Applicant: BANK OF AMERICA CORPORATION, Charlotte, NC (US)

(72) Inventors: Amit Mishra, Tamil Nadu (IN); Nipun Mahajan, Lawrenceville, NJ (US); Krithika Viswanathan, Tamil Nadu (IN); Sankari Bhagavathiappan Pravin Kumar, Tamil Nadu (IN); Suganthi V Shanmugavelayutham, Tamili Nadu (IN); Yogesh Raghuvanshi, Pennington, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 51 days.

(21) Appl. No.: 18/608,406

(22) Filed: Mar. 18, 2024

(65) Prior Publication Data

US 2025/0294093 A1 Sep. 18, 2025

(51) Int. Cl.
*H04M 3/51* (2006.01)

(52) U.S. Cl.
CPC ....... *H04M 3/5191* (2013.01); *H04M 3/5166* (2013.01); *H04M 2203/408* (2013.01)

(58) Field of Classification Search
CPC ............. H04M 3/5191; H04M 3/5166; H04M 2203/408
USPC ......... 379/265.09, 265.02, 242, 265.01, 272, 379/273, 268, 258, 271
See application file for complete search history.

(56) References Cited

U.S. PATENT DOCUMENTS

| | | | |
|---|---|---|---|
| 7,698,269 B2 | 4/2010 | Zhou | |
| 8,209,615 B2 | 6/2012 | Gupta | |
| 8,510,764 B1 | 8/2013 | Deselaers | |
| 9,083,581 B1 | 7/2015 | Addepalli | |
| 9,594,477 B1 | 3/2017 | Ardakani | |
| 9,806,942 B2 | 10/2017 | Saxena | |
| 9,807,644 B2 | 10/2017 | Ma | |
| 10,031,969 B2 | 7/2018 | Maharajh | |
| 10,042,933 B2 | 8/2018 | Johl | |
| 10,061,489 B2 | 8/2018 | Stein | |

(Continued)

FOREIGN PATENT DOCUMENTS

WO 2007096603 A2 8/2007

*Primary Examiner* — Thjuan K Addy
(74) *Attorney, Agent, or Firm* — Moore & Van Allen PLLC; Lauren Stokes

(57) ABSTRACT

Systems, computer program products, and methods for generating dynamic links in federated data channels is configured to identify an account identifier(s) based on at least one first communication channel; determine a secondary user(s) associated with the account identifier(s); access a user account preference database comprising the account identifier(s) and data associated with the secondary user(s); generate, by an intelligent deep link generator, an intelligent deep link message comprising content associated with the account identifier; access, based on the secondary user account(s), a virtual communication registry comprising an available communication channel identifier(s); select an available communication channel identifier(s) for the secondary user(s) based on the primary channel preference; and transmit the intelligent deep link message to the selected available communication channel identifier(s).

20 Claims, 8 Drawing Sheets

(56)         References Cited

U.S. PATENT DOCUMENTS

| | | | |
|---|---|---|---|
| 10,089,053 | B2 | 10/2018 | Gerlach |
| 10,127,089 | B2 | 11/2018 | Powell |
| 10,180,833 | B2 | 1/2019 | Sogani |
| 10,462,423 | B1 * | 10/2019 | Nguyen ................. H04N 7/152 |
| 10,630,840 | B1 | 4/2020 | Karp |
| 10,659,400 | B2 | 5/2020 | Moon |
| 10,667,101 | B2 | 5/2020 | Molinet |
| 10,965,810 | B1 | 3/2021 | Farnsworth |
| 11,113,456 | B2 | 9/2021 | Abrahami |
| 11,617,011 | B2 | 3/2023 | Loheide |
| 11,641,685 | B2 | 5/2023 | Kim |
| 11,741,945 | B1 * | 8/2023 | Sullivan .................. G10L 15/07 |
| | | | 704/270.1 |
| 11,757,764 | B2 | 9/2023 | Bataineh |
| 11,963,051 | B2 | 4/2024 | Umapathy |
| 11,979,350 | B1 | 5/2024 | Eyuboglu |
| 2013/0110815 | A1 | 5/2013 | Tankovich |
| 2016/0196579 | A1 | 7/2016 | Koura |
| 2016/0210334 | A1 | 7/2016 | Prophete |
| 2020/0014642 | A1 | 1/2020 | Sidi |
| 2020/0106850 | A1 | 4/2020 | Popowitz |
| 2022/0014963 | A1 | 1/2022 | Yeh |
| 2023/0291785 | A1 | 9/2023 | Seok |
| 2023/0419275 | A1 | 12/2023 | Fakhraie |

* cited by examiner

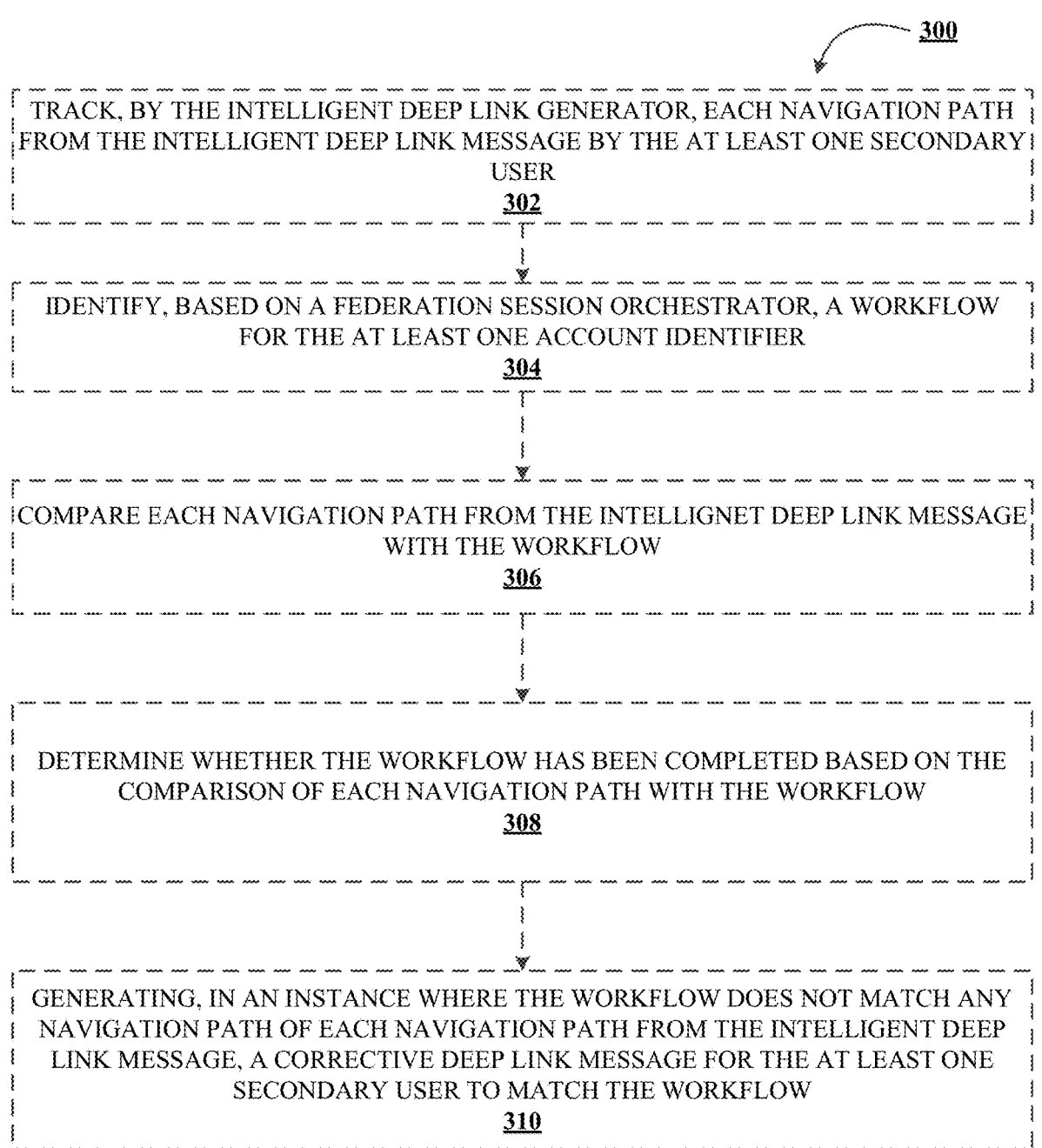

300

TRACK, BY THE INTELLIGENT DEEP LINK GENERATOR, EACH NAVIGATION PATH FROM THE INTELLIGENT DEEP LINK MESSAGE BY THE AT LEAST ONE SECONDARY USER
302

IDENTIFY, BASED ON A FEDERATION SESSION ORCHESTRATOR, A WORKFLOW FOR THE AT LEAST ONE ACCOUNT IDENTIFIER
304

COMPARE EACH NAVIGATION PATH FROM THE INTELLIGNET DEEP LINK MESSAGE WITH THE WORKFLOW
306

DETERMINE WHETHER THE WORKFLOW HAS BEEN COMPLETED BASED ON THE COMPARISON OF EACH NAVIGATION PATH WITH THE WORKFLOW
308

GENERATING, IN AN INSTANCE WHERE THE WORKFLOW DOES NOT MATCH ANY NAVIGATION PATH OF EACH NAVIGATION PATH FROM THE INTELLIGENT DEEP LINK MESSAGE, A CORRECTIVE DEEP LINK MESSAGE FOR THE AT LEAST ONE SECONDARY USER TO MATCH THE WORKFLOW
310

FIGURE 3

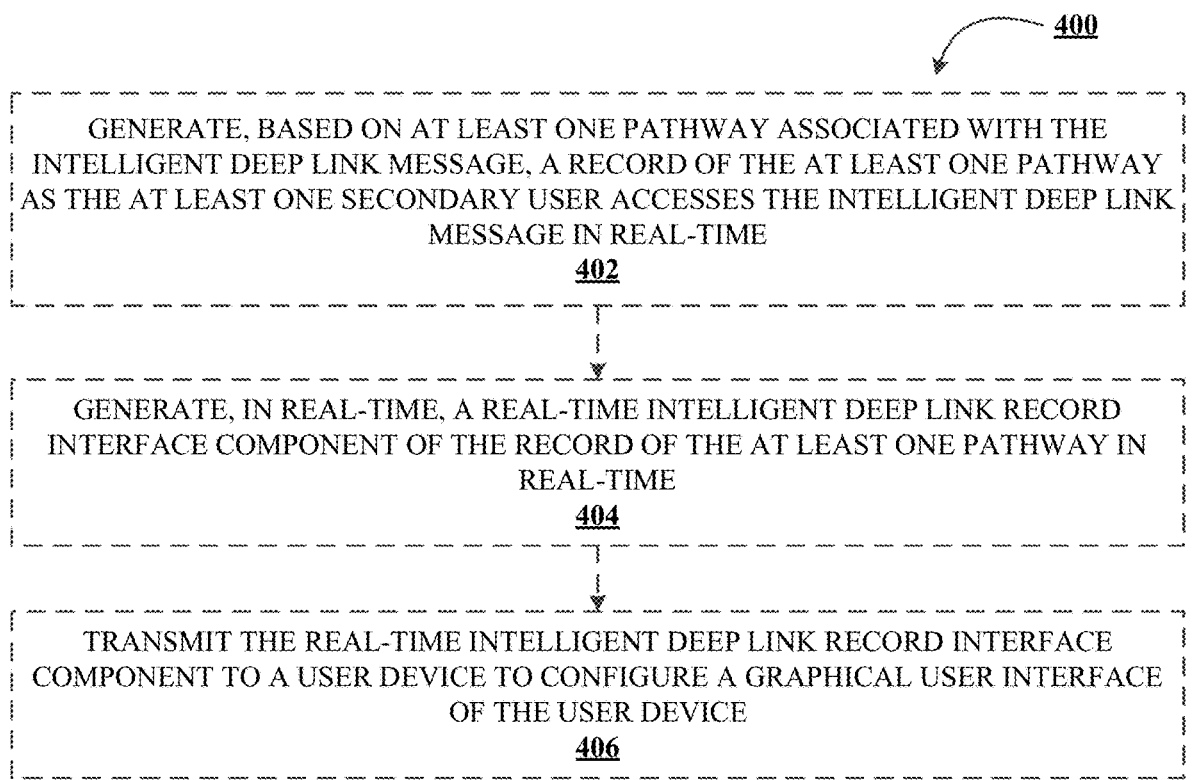

400

GENERATE, BASED ON AT LEAST ONE PATHWAY ASSOCIATED WITH THE INTELLIGENT DEEP LINK MESSAGE, A RECORD OF THE AT LEAST ONE PATHWAY AS THE AT LEAST ONE SECONDARY USER ACCESSES THE INTELLIGENT DEEP LINK MESSAGE IN REAL-TIME
402

GENERATE, IN REAL-TIME, A REAL-TIME INTELLIGENT DEEP LINK RECORD INTERFACE COMPONENT OF THE RECORD OF THE AT LEAST ONE PATHWAY IN REAL-TIME
404

TRANSMIT THE REAL-TIME INTELLIGENT DEEP LINK RECORD INTERFACE COMPONENT TO A USER DEVICE TO CONFIGURE A GRAPHICAL USER INTERFACE OF THE USER DEVICE
406

FIGURE 4

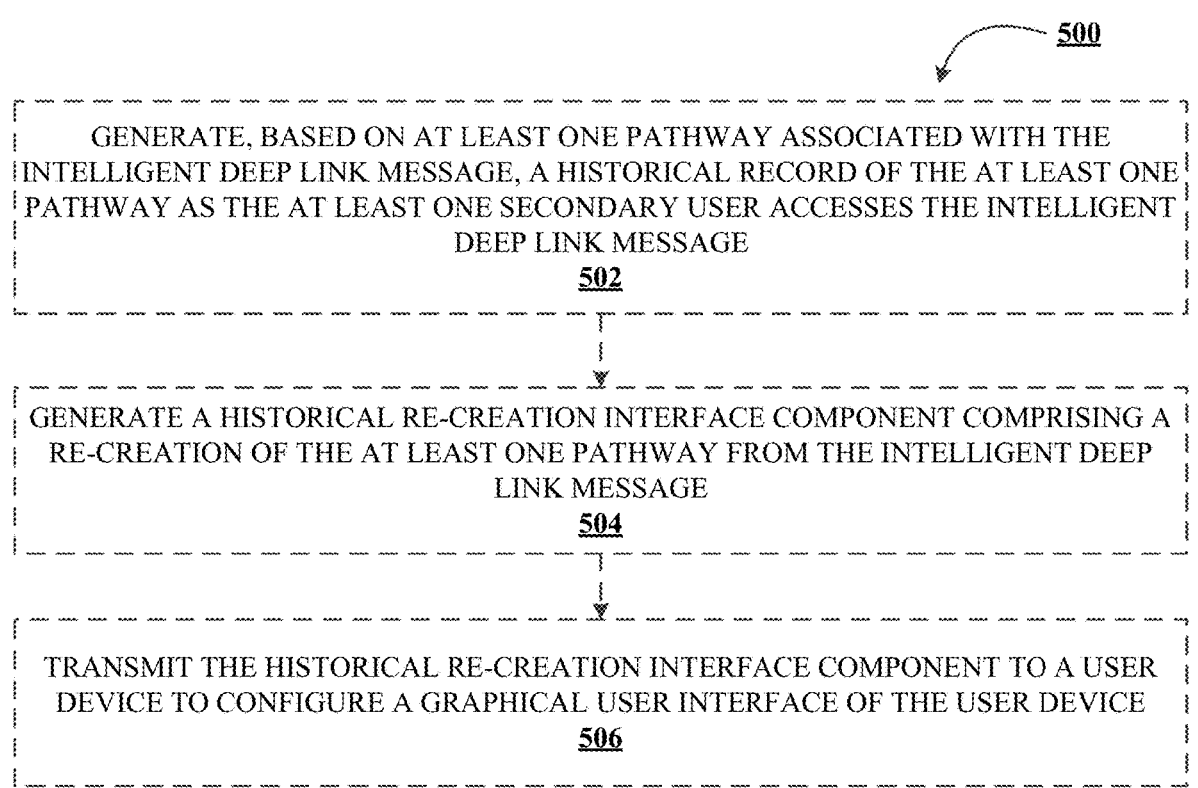

GENERATE, BASED ON AT LEAST ONE PATHWAY ASSOCIATED WITH THE INTELLIGENT DEEP LINK MESSAGE, A HISTORICAL RECORD OF THE AT LEAST ONE PATHWAY AS THE AT LEAST ONE SECONDARY USER ACCESSES THE INTELLIGENT DEEP LINK MESSAGE
502

GENERATE A HISTORICAL RE-CREATION INTERFACE COMPONENT COMPRISING A RE-CREATION OF THE AT LEAST ONE PATHWAY FROM THE INTELLIGENT DEEP LINK MESSAGE
504

TRANSMIT THE HISTORICAL RE-CREATION INTERFACE COMPONENT TO A USER DEVICE TO CONFIGURE A GRAPHICAL USER INTERFACE OF THE USER DEVICE
506

FIGURE 5

SYSTEMS AND METHODS FOR GENERATING DYNAMIC LINKS IN FEDERATED DATA CHANNELS

TECHNOLOGICAL FIELD

Example embodiments of the present disclosure relate to generating dynamic links in federated data channels.

BACKGROUND

Electronic communications, especially communication platforms such as interactive voice response (IVR) systems, cannot handle multi-party communications while also protecting privacy between each party's communication data. For example, and where an account requires multiple parties to contribute over remote and electronic communications, whereby such contribution comprising accessing at least one link or webpage, users accessing the electronic links may become distracted or go down the wrong path in interacting with a link when trying to complete the requirements of the multi-party communications. A need therefore exists for a system to protect user data over remote communications, while also promoting automatic and dynamic deep links within federated data channels to promote efficiency, data security, and automatic collection of deep link data as the user traverses through electronic channels.

Applicant has identified a number of deficiencies and problems associated with securing data in federated data channels between multiple communication channels and generating dynamic deep links within federated channels between the multiple communication channels. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for determining, managing, and securing data in federated data channels.

In one aspect, a system for generating dynamic links in federated data channels is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify at least one account identifier based on at least one first communication channel; determine at least one secondary user associated with the at least one account identifier; access a user account preference database comprising at least one account identifier and data associated with the at least one secondary user, wherein the data associated with the at least one secondary user comprises a primary channel preference; generate, by an intelligent deep link generator, an intelligent deep link message comprising content associated with the account identifier; access, based on the at least one secondary user account, a virtual communication registry comprising at least one available communication channel identifier; select at least one available communication channel identifier for the at least one secondary user based on the primary channel preference; and transmit the intelligent deep link message to the selected at least one available communication channel identifier.

In some embodiments, the data associated with the at least one secondary user comprises a secondary channel preference for the at least one secondary user.

In some embodiments, the data associated with the at least one secondary user comprises a channel router for the primary channel preference or the secondary channel preference.

In some embodiments, the content associated with the account identifier comprises an acceptance interface component for a request associated with the at least one account identifier.

In some embodiments, the intelligent deep link message comprises at least one rule built into the intelligent deep link message, and wherein the at least one rule comprises a direct transmission to a webpage for the at least one account identifier.

In some embodiments, the intelligent deep link generator tracks each navigation path from the intelligent deep link message. In some embodiments, executing the computer-readable code is configured to cause the at least one processing device to: track, by the intelligent deep link generator, each navigation path from the intelligent deep link message by the at least one secondary user; identify, based on a federation session orchestrator, a workflow for the at least one account identifier; compare each navigation path from the intelligent deep link message with the workflow; and determine whether the workflow has been completed based on the comparison of each navigation path with the workflow, wherein, in an instance where the workflow does not match any navigation path of each of navigation path from the intelligent deep link message, generate a corrective deep link message for the at least one secondary user to match the workflow.

In some embodiments, executing the computer-readable code is configured to cause the at least one processing device to: generate, based on at least one pathway associated with the intelligent deep link message, a record of the at least one pathway as the at least one secondary user accesses the intelligent deep link message in real-time; generate, in real-time, a real-time intelligent deep link record interface component comprising the record of the at least one pathway in real-time; and transmit the real-time intelligent deep link record interface component to a user device to configure a graphical user interface of the user device.

In some embodiments, wherein executing the computer-readable code is configured to cause the at least one processing device to: generate, based on at least one pathway associated with the intelligent deep link message, a historical record of the at least one pathway as the at least one secondary user accesses the intelligent deep link message; generate a historical re-creation interface component comprising a re-creation of the at least one pathway from the intelligent deep link message; and transmit the historical re-creation interface component to a user device to configure a graphical user interface of the user device.

Similarly, and as a person of skill in the art will understand, each of the features, functions, and advantages provided herein with respect to the system disclosed herein-above may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
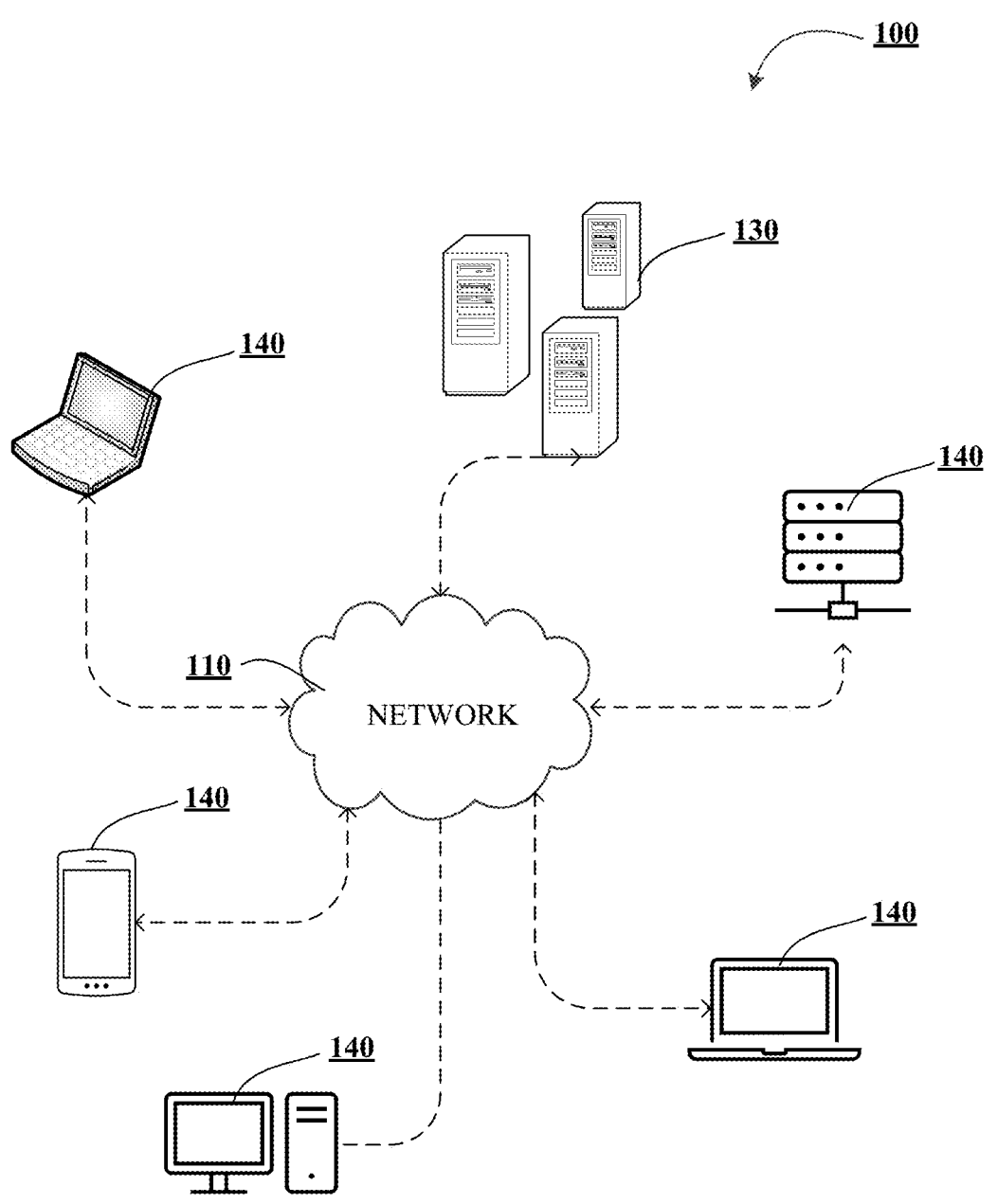
Figure 1B:
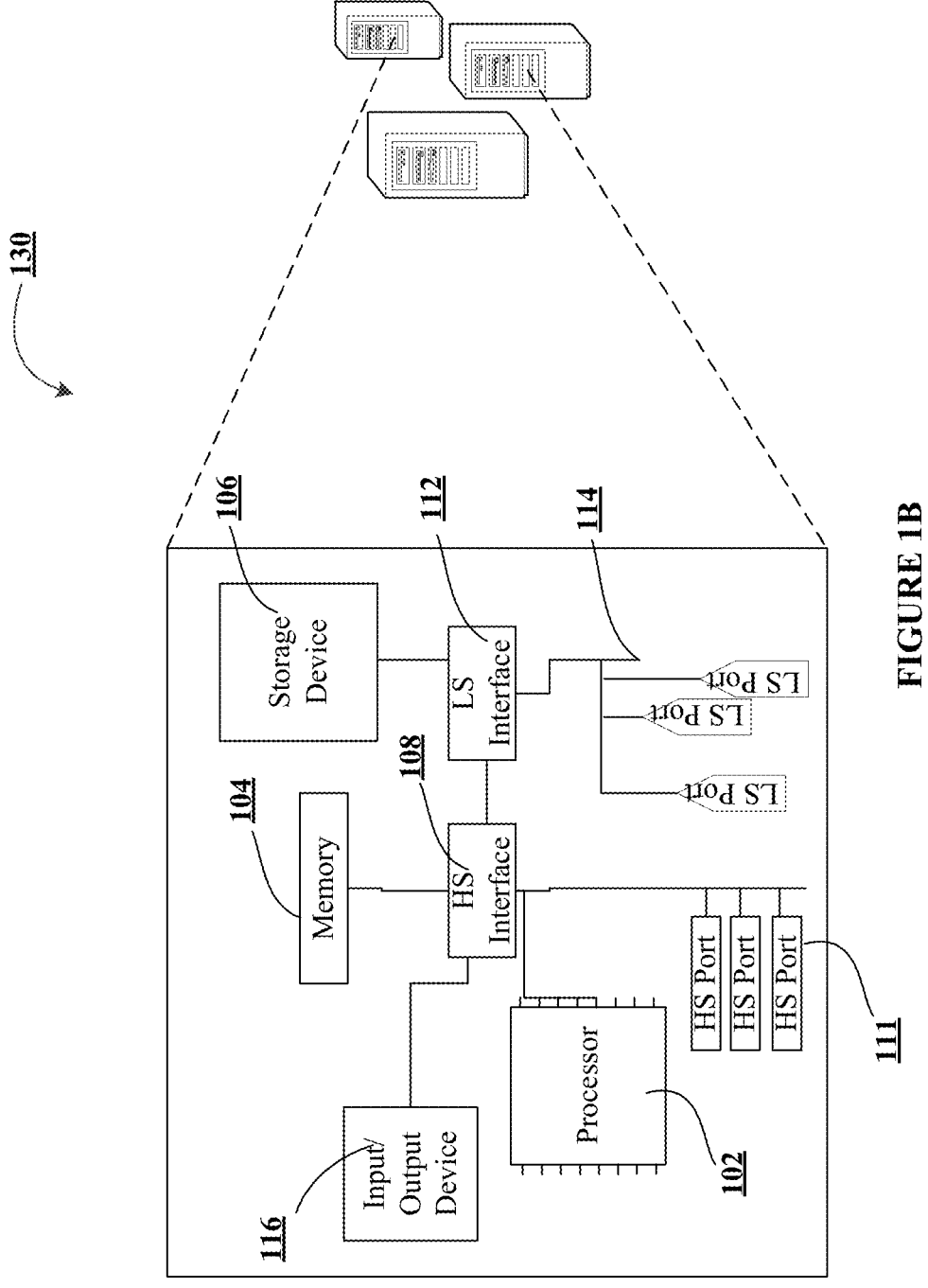
Figure 1C:
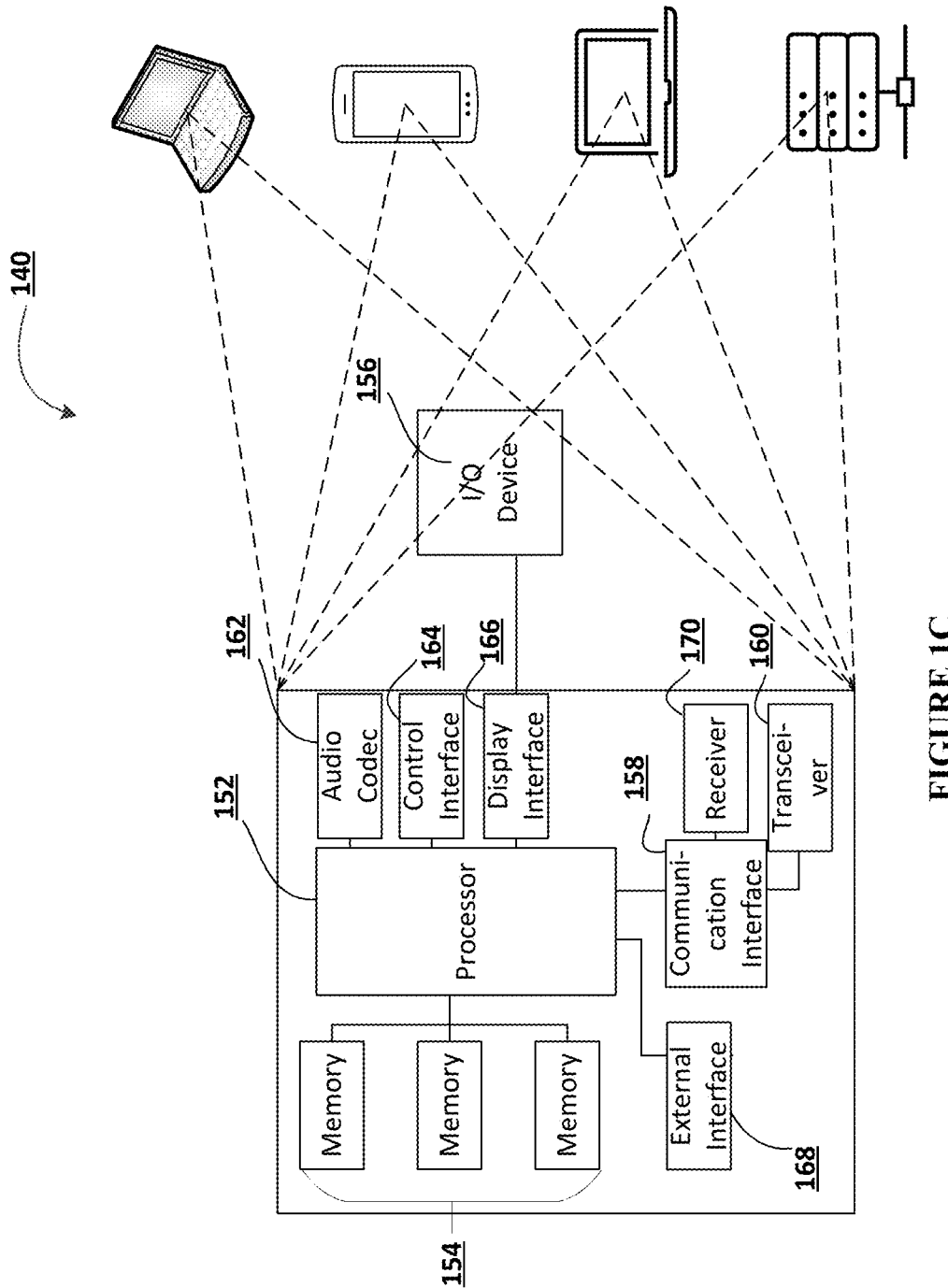
Figure 2:
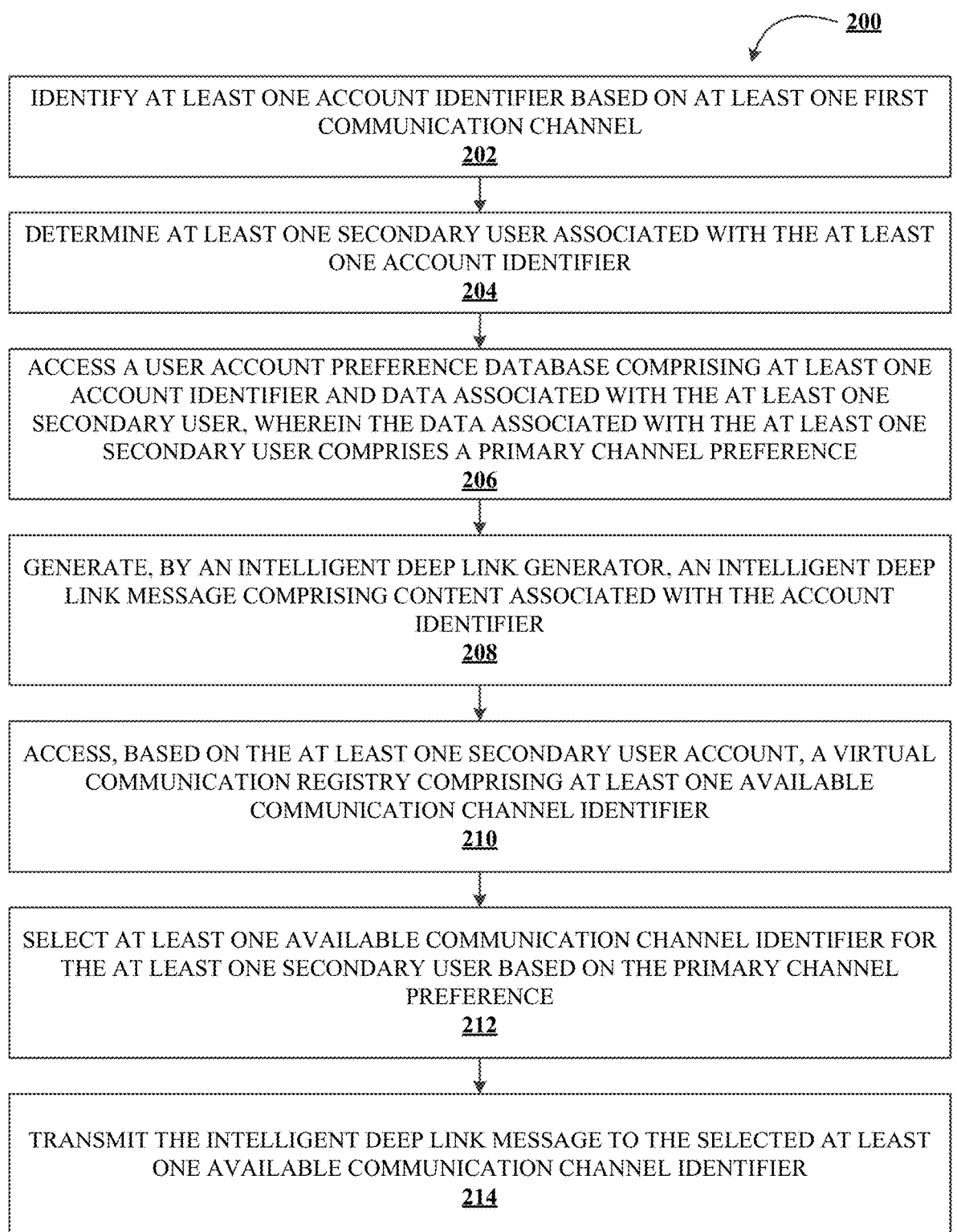
Figure 6:
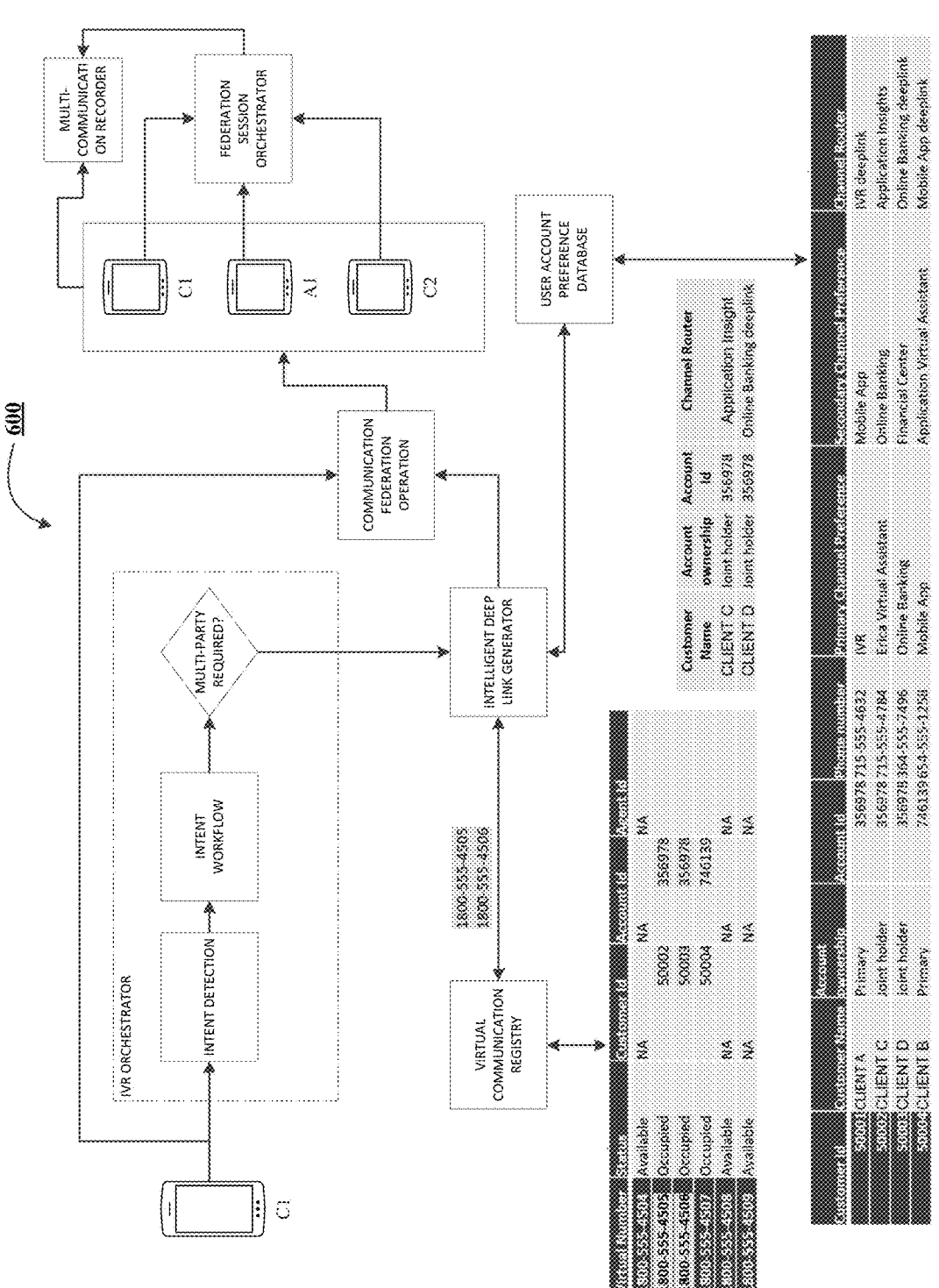

FIGS. 1A-1C illustrates technical components of an exemplary distributed computing environment for generating dynamic links in federated data channels, in accordance with an embodiment of the disclosure;

FIG. 2 illustrates a process flow for generating dynamic links in federated data channels, in accordance with an embodiment of the disclosure;

FIG. 3 illustrates a process flow for generating a corrective deep link message, in accordance with an embodiment of the disclosure;

FIG. 4 illustrates a process flow for generating and transmitting a real-time intelligent deep link record interface component, in accordance with an embodiment of the disclosure;

FIG. 5 illustrates a process flow for generating and transmitting a historical re-creation, in accordance with an embodiment of the disclosure; and FIG. 6 illustrates an exemplary flow diagram for generating dynamic links in federated data channels, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Electronic communications, especially communication platforms such as interactive voice response (IVR) systems, cannot handle multi-party communications while also protecting privacy between each party's communication data. For example, and where an account requires multiple parties to contribute over remote and electronic communications, whereby such contribution comprising accessing at least one link or webpage, users accessing the electronic links may become distracted or go down the wrong path in interacting with a link when trying to complete the requirements of the multi-party communications. A need therefore exists for a system to protect user data over remote communications, while also promoting automatic and dynamic deep links within federated data channels to promote efficiency, data security, and automatic collection of deep link data as the user traverses through electronic channels.

Accordingly, the present disclosure provides for the identification of at least one account identifier based on at least one first communication channel; determination of at least one secondary user associated with the at least one account identifier; an access of a user account preference database comprising at least one account identifier and data associated with the at least one secondary user, wherein the data associated with the at least one secondary user comprises a primary channel preference; and a generation, by an intelligent deep link generator, of an intelligent deep link message comprising content associated with the account identifier. In addition, the present disclosure provides for an access, based on the at least one secondary user account, of a virtual communication registry comprising at least one available communication channel identifier; a selection of at least one available communication channel identifier for the at least one secondary user based on the primary channel preference; and transmission of the intelligent deep link message to the selected at least one available communication channel identifier.

In other words, the present disclosure provides a deep link used to connect the multi-party(ies) to a primary channel (such as a primary channel generated by a communication federation operation). Specifically, an intelligent deep link generator (which may be configured to collect data regarding each user's preferences such as their preferred communication channel type and/or collect potential virtual numbers to merge the primary channel with a secondary channel(s)). For instance, the disclosure's intelligent deep link generator is configured to generate a deep link message on a preferred channel of a secondary user (e.g., a joint account holder) and/or through a virtual number that is determined to be available, and which can be linked with the same account identifier as the primary channel. Importantly, these deep links can be formed as intelligent deep links that have at least one rule built in, such that when the deep link is transmitted to the user, the user can select to consent to the terms within the deep link page after a direct transmission to the intended page or the user can navigate to other pages within the website and/or application. Upon navigating to other pages within the website and/or application, the intelligent deep link generator will track each of these paths, will compare these paths to a session orchestrator (e.g., a federation session orchestrator that tracks what steps in the workflow have been completed and what still needs to be completed), and will generate a corrective input to the intelligent deep link message to bring the user back to the intended page that needs consent. In some embodiments, the intelligent deep link message may be generated within the recipient entity's system, such that an agent of the recipient entity can see the entire pathway as the user interacts with and navigates their system.

In this manner, the intelligent deep link is not static, and instead comprises complete access to the user's history such that the entire session could be re-created (e.g., such as for an agent at the receiving entity). Thus, an agent at the receiving entity could gather the entire context around the deep link session and give insight on how to lead the user back to the necessary page.

What is more, the present disclosure provides a technical solution to a technical problem. As described herein, the technical problem includes the security of data in federated data channels between multiple communication channels and generating deep links within federated channels between the multiple communication channels. The technical solution presented herein allows for the protection of user data over remote communications, while also promoting automatic and dynamic deep links within federated data channels to promote efficiency, data security, and automatic collection of deep link data as the user traverses through electronic channels. In particular, the present disclosure is an improvement over existing solutions to the above-identified problems in technology (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for generating dynamic links in federated data channels 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components.

In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for generating dynamic links in federated data channels, in accordance with an embodiment of the disclosure. In some embodiments, a system (e.g., similar to one or more of the systems described herein with respect to FIGS. 1A-1C) may perform one or more of the steps of process flow 200. For example, a system (e.g., the system 130 described herein with respect to FIG. 1A-1C) may perform the steps of process 200.

As shown in block 202, the process flow 200 may include the step of identifying at least one account identifier based on at least one first communication channel. As used herein, the communication channel refers to data channel for transmitting communication data between a user and another user (such as an agent associated with an entity), whereby the communication channel may comprise text data transmissions, voice data transmissions, intelligent deep links, and/or the like. In some embodiments, the communication channel may comprise voice data transmissions that originate at a user device, such as a mobile device, which may be contact with an interactive voice response (IVR) system. In other words, and in some embodiments, the first communication channel occurs within an interactive voice response (IVR) channel type. In some such embodiments, the IVR may be configured to generate questions for the user at the mobile device, receive responses from the user, parse the responses, and determine a workflow for the user based on what the user wants to do (e.g., based on the responses given by the user, such as the reason for the communication session). As used herein, a plurality of communication channels may be occurring in parallel, but a first communication channel may be the trigger that kickstarts the processes described herein, whereby once a first communication channel is identified and received, the processes described herein (including the initiation of later communication channels such as a secondary (or third party) communication channel(s)) may occur secondarily and in parallel with the first communication channel.

Additionally, and as used herein, the communication data refers to data collected from the communication channel during a communication session (e.g., a phone call, an email exchange session, a texting session, and/or the like). In some embodiments, the communication session may comprise each of the communications between a user and an agent (such as an agent within an entity, such as a financial institution, company, and/or the like) and/or the user as the user interacts with an IVR, over a period of time where the communications are continuous. For instance, communications may be considered continuous where each communication is responsive to a previous communication message between the user and the agent. In some embodiments, the communication session may be limited to a pre-defined limit, such as 24 hours (which may be measured from the first communication received during a session either from the first user and/or the agent).

In some embodiments, the first communication data comprises an identification of an account identifier based on the first communication channel, and wherein an at least one second party communication requirement is based on the account identifier. For example, the system may collect the communication data from the first communication channel, parse the communication data, and determine whether the user of the first communication channel has transmitted an account identifier over the first communication channel. Such an account identifier may comprise authentication credentials, an account identifier number (such as a unique string of alphanumeric characters which uniquely identifies an account within an entity), and/or the like to uniquely identify an account that the user associated with the first communication channel is a part of. In some embodiments, such an account identified by the account identifier may comprise a plurality of associated users (such as joint account holders), whereby any authentication credentials received over a communication channel may uniquely identify each user associated with the account (such as a specific joint account holder).

As shown in block 204, the process flow 200 may include the step of determining at least one secondary user associated with the at least one account identifier. Based on the account identifier associated with the first communication channel, the system may determine whether a plurality of user accounts is associated with the account identifier, and therefore, whether at least one secondary user should be contacted. For example, and based on whether a secondary user (or a plurality of secondary users) should be contacted in order to carry out a workflow associated with the first communication channel, the system may initiate a secondary communication channel(s) for the secondary user(s).

In some embodiments, and based on the first communication channel data, the system may determine whether a plurality of users need to be contacted via a plurality of communication channels (such as by a first communication channel, a second/third party communication channel, a third/another third party communication channel, . . . an nth communication channel, and/or the like) until the workflow has been completed. By way of non-limiting example, a workflow determined by the system may determine that the first communication channel data indicated that the user of the first communication channel would like to open a resource credit account (such as a loan) which is tied to a joint account associated with a plurality of users, but where the user of the first communication channel is not a primary account holder. Thus, and based on this example, the system may determine that a secondary communication requirement is present and that the primary account holder should be contacted via a secondary communication channel before moving forward in the workflow. As understood by those of skill in the art, the above example is intended to be non-limiting and is only set forth for exemplary purposes.

Thus, and in other words, the secondary communication requirement may be determined based on the account identifier and whether or not the associated account is associated with multiple users (e.g., a joint account), and whether in order to move forward with the workflow, another user of the account should be communicated with. In some embodiments, the secondary communication requirement may comprise a primary joint account user account, such that a primary user listed on the account needs to be contacted first and foremost. In some embodiments, the secondary communication requirement may indicate that the plurality of users associated with the account identifier comprises only a primary account holder and a joint account holder, two primary account holders and a plurality of joint account holders, at least one [or a plurality] of authorized users, and/or any combination of account holders listed herein.

As shown in block 206, the process flow 200 may include the step of accessing a user account preference database comprising at least one account identifier and data associated with the at least one secondary user, wherein the data associated with the at least one secondary user comprises a primary channel preference. For example, the system may access a user account preference database which comprises at least one account identifier, the associated user account identifiers associated with the account identifier, and/or data associated with each associated user account (such as each user account's preferences regarding communication channels). Thus, and in an instance where a secondary user is identified for the account identifier, the system may access the user account preference database to parse the data associated with a secondary user account identifier and determine at least the secondary user's primary channel preference. In some embodiments, the user account preference database may further comprise a secondary channel preference, a channel router (such as for the primary channel preference or the secondary channel preference), and/or the like. In other words, and in some embodiments, the data associated with the at least one secondary user comprises a secondary channel preference for the at least one secondary user.

As shown in block 208, the process flow 200 may include the step of generating—by an intelligent deep link generator—an intelligent deep link message comprising content associated with the account identifier. For instance, the system may generate an intelligent deep link message which comprises a direct link to an intended webpage and/or intended application (and/or intended page within an application) associated with the workflow.

By way of non-limiting example, and where the block within the workflow comprises a document for execution, the intelligent deep link may comprise a directly to a webpage comprising the content of the document and a fillable interface component for executing the document. For example, the system may generate a deep link message comprising content associated with at least one step or block within the workflow, whereby the content may comprise information of the document (such as the same information as the actual document, itself), a signature line, and a fillable interface component for a user to sign (e.g., electronically sign). In other words, and in some embodiments, the content associated with the account identifier comprises an acceptance interface component for a request associated with the at least one account identifier.

In some embodiments, the intelligent deep link message may comprise at least one rule built into the intelligent deep link message, wherein the at least one rule comprises a direct transmission to a webpage for the at least one account identifier. Further, and as used herein, the intelligent deep link message may be configured with at least one rule (such as at least one built in rule) to track and record—in real time—each of the progressions or paths the user takes as the user interacts with the intelligent deep link message. For example, and upon accessing the intelligent deep link message and the underlying direct link to the intended webpage, the intelligent deep link message may track and record each of the clicks input by the user via the user device—in real time—including the clicks that take the user to a different webpage, what each webpage is in the path from the intelligent deep link message's intended webpage, and/or the like. In this manner, the intelligent deep link generator—through the rule(s) built into the intelligent deep link message—may access the complete record of each of each path the user takes from the intended webpage of the intelligent deep link message (e.g., including clicks, webpages visited, applications visited, and/or the like) and determine whether the user has completed or not completed the block or step of the workflow associated with the intended webpage. Such an embodiment is described in further detail below with respect to FIG. 3.

Additionally, and in some embodiments, the intelligent deep link message may further comprise the determined account identifier associated with the first communication channel. In some such embodiments, and based on this account identifier, the system may determine the users that are required to be contacted to carry out the workflow associated with the account identifier (e.g., the secondary user account(s)) and each of the required user's preferences for receiving the intelligent deep link message. For instance, the intelligent deep link message may be transmitted over a preferred channel preference outlined within a user preference database, or—as a backup option—a secondary channel preference where the preferred channel preference is not available. Additionally, and in some embodiments, each user may additionally indicate and/or the system itself may determine a channel router for each of the channels that data is transmitted to the user.

As shown in block 210, the process flow 200 may include the step of accessing—based on the at least one secondary user account—a virtual communication registry comprising at least one available communication channel identifier. For example, the system may initiate—after determining that a secondary communication requirement is present—the at least one secondary communication channel for the other user(s) identified with the secondary communication requirement and associated with the same account identifier as that identified based on the first communication channel.

In some such embodiments, the system may access a virtual communication registry to identify available communication channel(s) that may be used for the secondary communication channel(s). Additionally, and in some embodiments, the secondary communication channel selected from the available communication channel(s) may be based on user preferences for the user(s) required by the account identifier, such that the system attempts to contact the required user(s) with their preferred communication channel.

In some embodiments, the first communication channel and the at least one secondary communication channel comprises one communication channel type. For example, the system may contact the required user(s) using the same type of communication channel (e.g., phone call, text message, email, instant messaging over an application, and/or the like) as the communication channel type as the first communication channel. Such communication channel type may be determined for the required user(s) based on a user preference for each required user(s) and/or based on the available communication channel(s) currently available. In some embodiments, the first communication channel and the at least one secondary communication channel comprise different communication channel types. In contrast, and in some embodiments, the secondary communication channel may be of a different channel type than the first communication channel. In such embodiments, the secondary communication channel(s) may be based on available communication channel(s) currently available and/or the user preference(s) for the required user(s).

In some embodiments, and in the instance where a secondary communication requirement is not present, then the system and the processes described herein may continue without contacting the secondary user (or other users) via a secondary communication channel(s) (whereby, the number of users required to complete the workflow will be used to determine the number of users contacted for the account identifier and the number of communication channels used). In some embodiments, each user account may further comprise a channel router which identifies a particular or specific communication method within the communication channel. For instance, and where the primary channel preference (which may also be referred to as a preferred communication channel herein throughout) is an application, the channel router identified may comprise a particular messaging method within the application, a dashboard notification within the application, a deep link within the application, and/or the like.

As shown in block 212, the process flow 200 may include the step of selecting at least one available communication channel identifier for the at least one secondary user based on the primary channel preference. For example, and in some embodiments, the system may select—from the at least one available communication channel(s)—an available communication channel for each secondary communication channel. Thus, and based on the number of secondary communication channels needed to complete the workflow, the same number of available communication channels will be selected, such that each secondary communication channel will have its own available communication channel. In some embodiments, and based on each user's preference, each available communication channel may be of a different communication channel type. In some embodiments, and based on whether there are any available communication channels available for a preferred communication channel for a user, the system may instead use a backup or secondary communication channel (e.g., where there are no available communication channels for the preferred communication channel of a user), and/or the like.

In some embodiments, the selected at least one available communication channel is based on a user account preferred communication channel type associated with the user identifier (e.g., the user identifier associated with each individual user account. Additionally, and in some embodiments, the user account preferred communication channel type comprises a primary channel preference, a secondary channel preference, and a channel router preference. Thus, and in some embodiments, the selection of an available communication channel may be based on a channel router selected as a preference by a user, whereby the channel router may comprise a specific communication method within the communication channel. For instance, and where the primary channel preference (which may also be referred to as a preferred communication channel herein throughout) is an application, the channel router identified may comprise a particular messaging method within the application, a dashboard notification within the application, a deep link within the application, and/or the like.

As shown in block 214, the process flow 200 may include the step of transmitting the intelligent deep link message to the selected at least one available communication channel identifier. For example, the system may select—from the available communication channel(s) of the virtual communication registry—an available communication channel to transmit the intelligent deep link message to the secondary user. Thus, and where the primary channel preference is an application message via a particular application, the system may transmit the generated intelligent deep link message via that application's messaging service using the selected available communication channel. Additionally, and by of non-limiting example, where the primary channel preference is a text message to the secondary user, the selected available communication channel may be a virtual phone number from an entity associated with the account identifier (e.g., an entity managing and/or maintaining the account of the account identifier) and the system may transmit the intelligent deep link message from the virtual number selected to the user's mobile device.

FIG. 3 illustrates a process flow 300 for generating a corrective deep link message, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300.

In some embodiments, and as shown in block 302, the process flow 300 may include the step of tracking—by the intelligent deep link generator—each navigation path from the intelligent deep link message by the at least one secondary user. For example, and in order to determine whether the intended webpage comprises a completion of the block or step within the workflow (e.g., such as a user executing the document if that is the step of the workflow that is required), then the system—via the intelligent deep link generator may track each of the paths taken by the user and compare the paths taken against a session orchestrator (e.g., which may comprise the workflow and its steps) to determine if each step or at least one current step within the workflow has been completed. In the instance where at least one step within the pathway of the intelligent deep link generator does not match the workflow of the session orchestrator, then the intelligent deep link generator will determine that step of the workflow has not been completed and the intelligent deep link generator will take remediation steps to ensure it is completed. Thus, the intelligent deep link generator tracks each navigation path (i.e., pathway) from the intelligent deep link message.

In some embodiments, and as shown in block 304, the process flow 300 may include the step of identifying—based on a federation session orchestrator—a workflow for the at least one account identifier. For instance, and in some embodiments, the system may identify—based on a federation session orchestrator which is configured to organize data channels (such as the communication channels herein described) within a federated channel session. As used herein, the federation session orchestrator may be associated with a communication federation operation which refers to a system and/or process for generating a distributed communication session between multiple communication channels (e.g., a first communication channel and any required secondary communication channels), such that the multiple communication channels are queued correctly (e.g., based on the workflow and each user account identifier for the account identifier) and merged without revealing private data between the users within the distributed communication session.

Additionally, and based on the federation session orchestrator, the system may organize and synchronize the communication channels based on at least the workflow (overall and current step within the workflow) and the user account identifiers for each communication channel. Further, the federation session orchestrator may organize the communication channels and maintain the communication channels (such as by analyzing the current session of each communication channel both before and during the communication session). Additionally, and during the communication federation operation, the system may add in an agent communication channel which may be organized based on the federation session orchestrator to speak with both user communication channels, separately and based on the federation session orchestrator.

In some embodiments, the communication federation operation may comprise a process for organizing the identified at least one secondary communication channel and the first communication channel based on identifying a primary user account associated with the first communication data or the at least one secondary communication data. For example, and based on the account identifier and the users associated with the account identifier, the system may determine a primary user is associated with the account identifier and that the primary user must be contacted first before continuing with the workflow. For example, and in an instance where the user of the first communication channel is only an authorized user, and where the system determines that a primary user must be contacted over a third party communication channel, the system may halt the workflow until the primary user is contacted and the secondary communication channel is verified by the communication federation operation and/or the federation session orchestrator. Additionally, and while completing the workflow, the federation session orchestrator may synchronize the communication channels such that at each block of the workflow where the primary user must agree or disagree, the federation session orchestrator will organize the communication channels such that the primary user is contacted first for the associated block (e.g., and transmitted the intelligent deep link message first). In some embodiments, and as described in further detail below, such a federation session orchestrator may organize the communication channels and apply an agent communication channel such that the agent communication channel is in contact with both the user communication channels to carry out the workflow.

In some embodiments, and as shown in block 306, the process flow 300 may include the step of comparing each navigation path from the intelligent deep link message with the workflow. For instance, the system may compare—during the communications with the users of the federated communication channel/communication session intended to complete the workflow—whether the step or block associated with the intelligent deep link message has been completed. Thus, and by way of example, the system—after determining the workflow of the first communication channel—may compare the workflow and/or the step of the workflow intended to be met or completed by the intelligent deep link message against the path(s) taken by the user when interacting with the intelligent deep link message and/or after interacting with the intelligent deep link message (e.g., where the user may go to a different webpage completely, the path may still be tracked and recorded) to determine whether the step (e.g., an execution of a document, a review of a document, a watching of a video, an input of data, and/or the like) for the workflow has been completed by the user. In this manner, and even where the user clicks outside of the intelligent deep link message and/or clicks/selects a different webpage outside of the intelligent deep link message, but then later goes back to the intended webpage of the intelligent deep link message and complete the step, the system will be able to compare the path and determine the step has been completed. However, and where the user does not complete the step of the intelligent deep link message, the intelligent deep link generator may generate a corrective deep link message and transmit the corrective deep link message back to the user (e.g., over the same selected available communication channel that was previously used to transmit the original intelligent deep link message). Such an embodiment is described in further detail below.

Additionally, and in some embodiments, the system may determine the user has not completed the step of the workflow via the intelligent deep link message based on a predetermined time passing. For instance, and such a predetermined time may comprise a short period, such as five minutes, ten minutes, fifteen minutes, and/or the like.

In some embodiments, and as shown in block 308, the process flow 300 may include the step of determining whether the workflow has been completed based on the comparison of each navigation path with the workflow. For example, and in some embodiments, the system may compare each step in the navigation pathway(s) of the user in interacting with the intelligent deep link message against the workflow (e.g., against the step of the workflow and its completion data) to determine whether any of the steps or blocks of the navigation pathway match—which would indicate that the step or block of the workflow has been completed. In contrast, and where none of the steps or blocks of the navigation pathway match the step of the workflow and its completion data, then the system may determine that the step of the workflow has not been completed.

In some embodiments, and as shown in block 310, the process flow 300 may include the step generating—in an instance where the workflow does not match any navigation path of each navigation path from the intelligent deep link message—a corrective deep link message for the at least one secondary user to match the workflow. For example, the system may generate a corrective deep link message which will comprise a corrective input and/or corrective link back to the intended webpage to complete the step in the workflow. In some such embodiments, the corrective deep link message may comprise a pop-up feature, such that the corrective deep link message pops up as a push notification on the secondary user's user device.

FIG. 4 illustrates a process flow 400 for generating and transmitting a real-time intelligent deep link record interface component, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400.

In some embodiments, and as shown in block 402, the process flow 400 may include the step of generating—based on at least one pathway associated with the intelligent deep link message—a record of the at least one pathway as the at least one secondary user accesses the intelligent deep link message in real-time. For instance, and in some embodiments, the system may generate a record comprising each of the mouse clicks, webpages visited, interactions, keyboard clicks, data input, and/or the like, for each user after selecting and accessing the intelligent deep link message. Such a record may comprise some or all the data herein described above. In some embodiments, there may be multiple pathways for each intelligent deep link message, such as where a user leaves the intended webpage, inputs some mouse clicks and interacts with a secondary webpage, then goes back to the intended webpage, and then leaves the intended webpage to interact with a third webpage, and/or the like. Thus, and by way of non-limiting example, where the user leaves the intended webpage (either for a first time, a second time, and/or the like), a new pathway may be generated. In some embodiments, however, only one pathway may be generated which comprises every piece of data input by the user (including but not limited to mouse clicks, webpages visited, interactions, keyboard inputs/clicks, data input, and/or the like) from the first access of the intended webpage of the intelligent deep link message, including any subsequent revisits to the intended webpage.

In some embodiments, and as shown in block 404, the process flow 400 may include the step of generating—in real-time—a real-time intelligent deep link record interface component of the record of the at least one pathway in real-time. For instance, and in some embodiments, the system may generate—in real-time (or in near-real time)—an intelligent deep link record interface component comprising the record of the pathway(s). In this manner, the intelligent deep link interface component comprises data of the record of the pathway(s), which is packaged as a data packet and transmitted as an interface component from the system to a user device (such as a user device associated with an agent of an entity, such as a financial institution, and/or the like) and which configures (e.g., automatically configures) the graphical user interface (GUI) of the agent's user device to show the record of the pathway as the secondary user(s) are interacting with and moving within/from the intelligent deep link message and its intended webpage.

In some embodiments, and as shown in block 406, the process flow 400 may include the step of transmitting the real-time intelligent deep link record interface component to a user device to configure a graphical user interface (GUI) of the user device. For example, and in some embodiments, the system may transmit the real-time intelligent deep link record interface component may be transmitted to a user device (such as an agent's user device) and configure the user device's GUI to show the record of the intelligent deep link message in real-time. In some such embodiments, the user of the user device (e.g., an agent) may view the interactions of the secondary user in real-time via the real-time intelligent deep link record interface component and may transmit a corrective intelligent deep link message when the agent sees that the secondary user is going too far astray from the intended webpage.

FIG. 5 illustrates a process flow 500 for generating and transmitting a historical re-creation, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500.

In some embodiments, and as shown in block 502, the process flow 500 may include the step of generating—based on at least one pathway associated with the intelligent deep link message—a historical record of the at least one pathway as the at least one secondary user accesses the intelligent deep link message. For example, and in some embodiments, the system may track and record each of the interactions from the secondary user(s) after accessing the intelligent deep link message in a historical record of the pathway(s) from the intelligent deep link message. In this manner, the historical record may comprise the data input, selected, clicks, webpages and applications accessed or attempted accessed, from the intelligent deep link message.

In some embodiments, the historical record of the at least one pathway may be stopped or capped based on the end of the secondary user's (or users') interactions with and from the intelligent deep link message. For example, and where a predetermined time is used to determine whether the secondary user has completed the step of the workflow, the historical record may be generated right after the predetermined time has ended and show all of the interactions of the secondary user once the intelligent deep link message was first accessed.

In some embodiments, and as shown in block 504, the process flow 500 may include the step of generating a historical re-creation interface component comprising a re-creation of the at least one pathway from the intelligent deep link message. For example, and in some embodiments, the system may generate a historical re-creation interface component comprising a re-creation of the historical record which may be interacted with via a configuration a GUI of a user device (e.g., an agent's user device). In this manner, the historical record may comprise all the data associated interactions of an intelligent deep link message and all such data may be interacted with and viewed in more detail by the agent via the agent's user device.

In some embodiments, and as shown in block 506, the process flow 500 may include the step of transmitting the historical re-creation interface component to a user device to configure a graphical user interface (GUI) of the user device. For example, the system may transmit the historical re-creation interface component to a user device (such as an agent's user device) and configure the user device's GUI to show the historical record of the intelligent deep link message. In some such embodiments, the user of the user device (e.g., an agent) may view the interactions of the secondary user over the entire pathway(s) from the intelligent deep link message's access and may transmit—based on this data in the historical re-creation—a corrective intelligent deep link message when the agent sees that the secondary user did not complete the step of the workflow intended with the intelligent deep link message.

FIG. 6 illustrates an exemplary flow diagram 600 for generating dynamic links in federated data channels, in accordance with an embodiment of the disclosure. In some embodiments, a system (e.g., similar to one or more of the systems described herein with respect to FIGS. 1A-1C) may perform one or more of the steps of flow diagram 600. For example, a system (e.g., the system 130 described herein with respect to FIG. 1A-1C) may perform the steps of flow diagram 600.

As shown in exemplary flow diagram 600, a first communication channel from a user may occur from a user device C1, and such first communication data may be extracted and parsed within the IVR orchestrator in order to detect an intention, determine a workflow (e.g., the intent workflow), and determine whether a secondary requirement exists (e.g., whether a multi-party is required). Based on the determination that a third party requirement exists, the exemplary flow may continue to the intelligent channel deep link generator, which may be configured to generate intelligent channel deep links for the communication channels herein identified. Such intelligent deep links may be generated and transmitted based on the virtual communication registry(ies) (which may comprise one or more available communication channels for selection for the third party communication channel(s), such as those shown as virtual phone numbers 1800-555-4505 and 1800-555-4506), and may be transmitted over the selected available communication channel(s). Additionally, and based on the user preferences of each user of the secondary communication channel(s), the virtual communication registry may be used to select the preferred available communication channel(s) for each user (such as the primary channel preference listed for each user, or as a backup, the secondary channel preference). Similarly, the intelligent channel deep links may additionally be sent over the available communication channel determined and selected based on the data found in the user account preference database. Additionally, and upon transmitting the intelligent deep link message to the user via the selected available communication channel, the system—via the intelligent deep link generator—may track and record each of the interactions by the secondary user both with and beyond the intelligent deep link message and such data may be used to determine whether the intended step or block of the workflow has been completed by the secondary user. In an instance where the intended step has not been completed, the system may then use the intelligent deep link generator to generate a corrective deep link message, which in some embodiments may use the same previously selected available communication channel and/or a newly selected available communication channel (such as where the previously selected available communication channel is no longer available).

Upon generating the intelligent channel deep link and/or upon selecting the available communication channel, the system and the flow diagram 600 may continue to the communication federation operation to organize and maintain the first communication channel (e.g., the communication channel associated with C1) and the secondary communication channel(s) (e.g., C2, . . . and not shown CN) based on the pattern and organization of the federation session orchestrator which may control the requests and the responses, and their associated collection of data between each communication channel. Additionally, and as shown in flow diagram 600, an available agent communication channel (A1) may additionally be applied by the communication federation operation to the communication session with the first communication channel and the third party communication channel(s). Further, and in some embodiments, the data collected from this communication session of the federation session orchestrator may be recorded fully using a multi-communication recorder, which is designed and configured to track and organize each of the response data received from each communication channel (e.g., including the first communication channel, any third party communication channels, and the available agent communication channel).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. Patent Application No. | Title | Filed On |
|---|---|---|---|
| 15604US1.014033.4882 | 18/608,342 | SYSTEMS AND METHODS FOR DETERMINING, MANAGING, AND SECURING DATA IN FEDERATED DATA CHANNELS | Concurrently herewith |

What is claimed is:

1. A system for generating dynamic links in federated data channels, the system comprising:

a memory device with computer-readable program code stored thereon;

at least one processing device operatively coupled to the at least one memory device and the at least one communication device, wherein executing the computer-readable code is configured to cause the at least one processing device to:

identify at least one account identifier based on at least one first communication channel;

determine at least one secondary user associated with the at least one account identifier;

access a user account preference database comprising at least one account identifier and data associated with the at least one secondary user, wherein the data associated with the at least one secondary user comprises a primary channel preference;

generate, by an intelligent deep link generator, an intelligent deep link message comprising content associated with the account identifier;

access, based on the at least one secondary user account, a virtual communication registry comprising at least one available communication channel identifier;

select at least one available communication channel identifier for the at least one secondary user based on the primary channel preference; and transmit the intelligent deep link message to the selected at least one available communication channel identifier.

2. The system of claim 1, wherein the data associated with the at least one secondary user comprises a secondary channel preference for the at least one secondary user.

3. The system of claim 1, wherein the data associated with the at least one secondary user comprises a channel router for the primary channel preference or the secondary channel preference.

4. The system of claim 1, wherein the content associated with the account identifier comprises an acceptance interface component for a request associated with the at least one account identifier.

5. The system of claim 1, wherein the intelligent deep link message comprises at least one rule built into the intelligent deep link message, and wherein the at least one rule comprises a direct transmission to a webpage for the at least one account identifier.

6. The system of claim 1, wherein the intelligent deep link generator tracks each navigation path from the intelligent deep link message.

7. The system of claim 6, wherein executing the computer-readable code is configured to cause the at least one processing device to:

track, by the intelligent deep link generator, each navigation path from the intelligent deep link message by the at least one secondary user;

identify, based on a federation session orchestrator, a workflow for the at least one account identifier;

compare each navigation path from the intelligent deep link message with the workflow; and determine whether the workflow has been completed based on the comparison of each navigation path with the workflow, wherein, in an instance where the workflow does not match any navigation path of each of navigation path from the intelligent deep link message, generate a corrective deep link message for the at least one secondary user to match the workflow.

8. The system of claim 1, wherein executing the computer-readable code is configured to cause the at least one processing device to:

generate, based on at least one pathway associated with the intelligent deep link message, a record of the at least one pathway as the at least one secondary user accesses the intelligent deep link message in real-time;

generate, in real-time, a real-time intelligent deep link record interface component comprising the record of the at least one pathway in real-time; and transmit the real-time intelligent deep link record interface component to a user device to configure a graphical user interface of the user device.

9. The system of claim 1, wherein executing the computer-readable code is configured to cause the at least one processing device to:

generate, based on at least one pathway associated with the intelligent deep link message, a historical record of the at least one pathway as the at least one secondary user accesses the intelligent deep link message;

generate a historical re-creation interface component comprising a re-creation of the at least one pathway from the intelligent deep link message; and transmit the historical re-creation interface component to a user device to configure a graphical user interface of the user device.

10. A computer program product for generating dynamic links in federated data channels, wherein the computer program product comprises at least one non-transitory computer-readable medium having computer-readable program code portions embodied therein, the computer-readable program code portions which when executed by a processing device are configured to cause the processor to:

identify at least one account identifier based on at least one first communication channel;

determine at least one secondary user associated with the at least one account identifier;

access a user account preference database comprising at least one account identifier and data associated with the at least one secondary user, wherein the data associated with the at least one secondary user comprises a primary channel preference;

generate, by an intelligent deep link generator, an intelligent deep link message comprising content associated with the account identifier;

access, based on the at least one secondary user account, a virtual communication registry comprising at least one available communication channel identifier;

select at least one available communication channel identifier for the at least one secondary user based on the primary channel preference; and transmit the intelligent deep link message to the selected at least one available communication channel identifier.

11. The computer program product of claim 10, wherein the data associated with the at least one secondary user comprises a secondary channel preference for the at least one secondary user.

12. The computer program product of claim 10, wherein the data associated with the at least one secondary user comprises a channel router for the primary channel preference or the secondary channel preference.

13. The computer program product of claim 10, wherein the content associated with the account identifier comprises an acceptance interface component for a request associated with the at least one account identifier.

14. The computer program product of claim 10, wherein the intelligent deep link message comprises at least one rule built into the intelligent deep link message, and wherein the at least one rule comprises a direct transmission to a webpage for the at least one account identifier.

15. The computer program product of claim 10, wherein the intelligent deep link generator tracks each navigation path from the intelligent deep link message.

16. A computer-implemented method for generating dynamic links in federated data channels, the computer-implemented method comprising:

identifying at least one account identifier based on at least one first communication channel;

determining at least one secondary user associated with the at least one account identifier;

accessing a user account preference database comprising at least one account identifier and data associated with the at least one secondary user, wherein the data associated with the at least one secondary user comprises a primary channel preference;

generating, by an intelligent deep link generator, an intelligent deep link message comprising content associated with the account identifier;

accessing, based on the at least one secondary user account, a virtual communication registry comprising at least one available communication channel identifier;

selecting at least one available communication channel identifier for the at least one secondary user based on the primary channel preference; and transmitting the intelligent deep link message to the selected at least one available communication channel identifier.

17. The computer-implemented method of claim 16, wherein the data associated with the at least one secondary user comprises a secondary channel preference for the at least one secondary user.

18. The computer-implemented method of claim 16, wherein the data associated with the at least one secondary user comprises a channel router for the primary channel preference or the secondary channel preference.

19. The computer-implemented method of claim 16, wherein the content associated with the account identifier comprises an acceptance interface component for a request associated with the at least one account identifier.

20. The computer-implemented method of claim 16, wherein the intelligent deep link message comprises at least one rule built into the intelligent deep link message, and wherein the at least one rule comprises a direct transmission to a webpage for the at least one account identifier.

\* \* \* \* \*